May 23, 1950 A. W. GUSTAFSON 2,508,712
TIRE BEAD PRYING LEVER
Filed Oct. 16, 1946

Inventor
Albert W. Gustafson

By Clarence A. O'Brien
and Harvey B. Jacobson
Attorneys

Patented May 23, 1950

2,508,712

UNITED STATES PATENT OFFICE 2,508,712

TIRE BEAD PRYING LEVER

Albert W. Gustafson, Kearney, Nebr.

Application October 16, 1946, Serial No. 703,701

1 Claim. (Cl. 157—1.3)

This invention relates to new and useful improvements to tire tools and more particularly to a device adapted to remove a vehicle tire from the rim holding said tire.

The primary feature of this invention is to provide a device of this character having a free edge curved transversely in an arc corresponding with the curvature of the periphery of the rim, said free edge easily and quickly disengaging the tire casing from the rim to which it may have adhered when the operator pulls the upper end of said tool toward the center of the rim.

Another feature of this invention is to provide a device of this character which is strong and durable and occupies very little space when stored or shipped.

A further feature of this invention is to provide a device of the character described that is efficient and reliable in operation, relatively inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1:
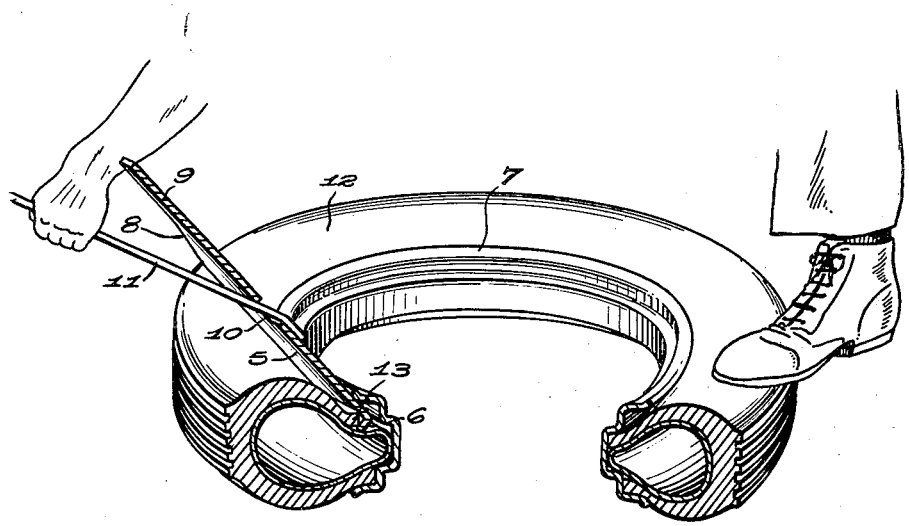
Figure 1 is a perspective view in part showing the tire tool in position for removing a tire, the tool being shown in section.
Figure 2:
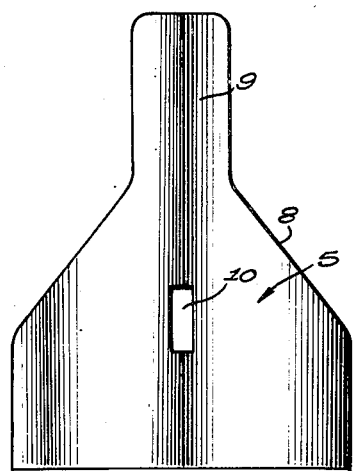
Figure 2 is a front elevational view of the invention.
Figure 3:
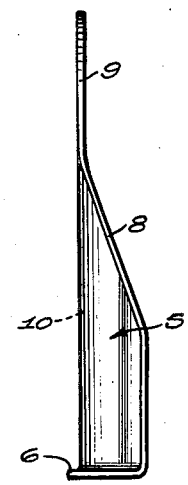
Figure 3 is a side view thereof.
Figure 4:
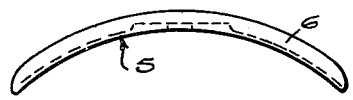
Figure 4 is a bottom plan view of Figure 2.

Referring now to the drawings in detail, wherein, for the purpose of illustration, I have disclosed a preferred embodiment of the invention, the numeral 5 represents the transversely curved body of the tool, formed at its lower end into a flange or free edge 6, said free edge also being curved in an arc corresponding with the curvature of the periphery of a conventional rim 7.

The upper side edges 8 of said body are inclined inwardly toward a handle or lever 9 formed at the upper end of said body, said handle being substantially flat to facilitate gripping thereof.

A rectangular opening 10 is punched through the central portion of the body, said opening adapted to receive the end of a lever bar 11 or similar lever means usually forming a part of a vehicle jack.

To remove a tire 12 from the rim 7 of a vehicle wheel, the operator standing on the opposite side of the tire will insert the free end 6 of the tool between rim 7 and the bead 13 of the tire and by pulling handle 9 toward himself, he will free enough of the tire bead out of engagement with the rim in one operation sufficiently to disengage the rest of the tire without the employment of other tools.

If additional leverage means is desirable, a lever bar 11 may be inserted in opening 10, as clearly illustrated in Figure 1.

In view of the foregoing description taken in conjunction with the accompanying drawings, it is believed that a clear understanding of the construction, operation and advantages of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claim.

What I claim:

A tire tool for removing a vehicle tire from a rim comprising a transversely curved body plate having opposing concave and convex sides, a flat handle integrally extending from one end of the body, a flange disposed on the other end of the body and extending laterally from the convex side thereof, said flange corresponding at its juncture point to the curvature of the body portion, and being complementary to the curvature of a tire rim periphery, said body adjacent said handle having a transverse aperture therein to receive a leverage means removably engaged in said opening.

ALBERT W. GUSTAFSON.

REFERENCES CITED

The following references are of record in the file of this patent:

UNITED STATES PATENTS

| Number | Name | Date |
|---|---|---|
| 597,286 | Horswill | Jan. 11, 1898 |
| 1,475,517 | Snider | Nov. 27, 1923 |
| 2,226,757 | Ewell | Dec. 31, 1940 |
| 2,307,473 | Stinaff | Jan. 5, 1943 |
| 2,399,146 | Schumann | Apr. 23, 1946 |